Feb. 16, 1954  H. C. FRIEND  2,669,233

ARTICLE OF FEMININE HYGIENE

Original Filed July 10, 1951

INVENTOR.
H. C. FRIEND
BY
Merrill M. Blackburn
ATTORNEY

Patented Feb. 16, 1954

2,669,233

UNITED STATES PATENT OFFICE 2,669,233

ARTICLE OF FEMININE HYGIENE

Homer C. Friend, Davenport, Iowa

Substituted for abandoned application Serial No. 236,012, July 10, 1951. This application October 21, 1952, Serial No. 316,041

2 Claims. (Cl. 128—251)

This is a substitute for abandoned application Serial No. 236,012, filed July 10, 1951.

This invention relates to an article of feminine hygiene and, specifically, to an article for connection to a faucet for delivering a stream of water at a desired temperature for flushing out the vagina.

Among the objects of this invention are to provide a device which will enable the user to test the temperature of the water before utilizing the same; to change the direction of flow of the water when the temperature has been adjusted; and such further objects, advantages, and capabilities as will hereafter appear and as are inherent in the construction disclosed herein.

In the drawings annexed hereto and forming a part hereof,

Figure 1:
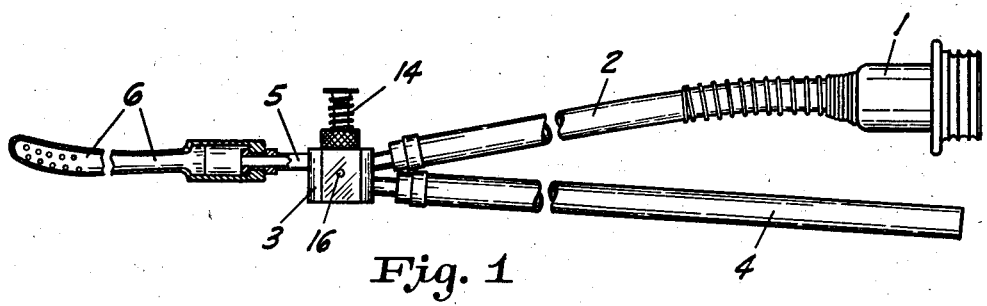
Fig. 1 shows an elevation of my new construction with hose connection thereto.
Figure 2:
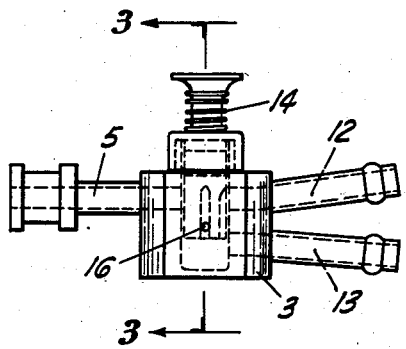
Fig. 2 is an enlarged elevation of the flow-controlling element.
Figure 3:
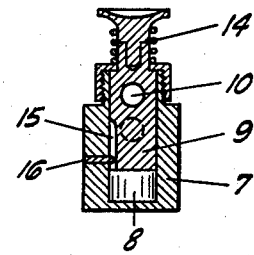
Fig. 3 is a transverse sectional view substantially along the plane indicated by the line 3—3, Fig. 2.

Reference will now be made in greater detail to the annexed drawings for a more complete description of this invention. A connection piece 1 is used to connect the construction to a mixing faucet, and to this is connected a hose 2. The hose 2 is also connected to a valve 3, which may have a hose 4 for returning the water to a place of disposal, as, for example, a toilet or a sink. From the opposite side of the valve 3 leads another outlet 5 to which there is connected a vaginal douche 6.

The control valve 3 comprises a body 7 provided with a central aperture 8 in which is a longitudinal movable valve member or plug 9 having a transverse opening 10. This valve member or plug 9 has a groove cut in one side thereof, as shown at 11, which may have communication with opening 12 or opening 13, which openings have connection with the hose 2 or the hose 4. When pressure is released from the head of valve member or plug 9, this is moved upwardly by a spring 14 so that groove 11 registers with the inlet opening 12.

Figure 4:
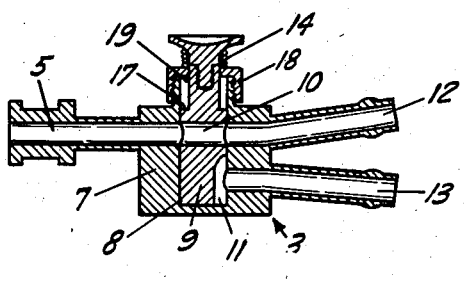
Fig. 4 is a longitudinal section of the structure shown in Fig. 2.
Figure 5:
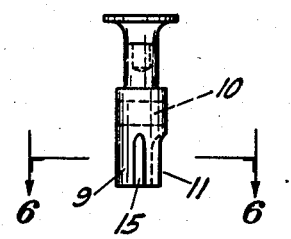
Fig. 5 is a detached view of the movable valve member.
Figure 6:
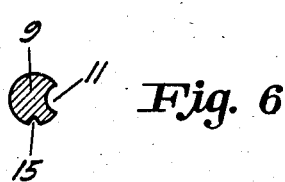
Fig. 6 represents a cross-section of the structure shown in Fig. 5, substantially along the plane indicated by the line 6—6 of that figure.

When the parts are thus arranged, water is allowed to flow through the hose or tube 2, the control valve 3, and the hose or tube 4. When the temperature of the water has been regulated to the desired heat, the valve member or plug 9 is pressed downwardly, as shown in Fig. 4, and then water flows through the opening 10 and out of the vaginal douche 6. The valve member or plug 9 has one end reduced to form a stem 19 which is surrounded by the spring 14. Thus there is also formed a shoulder 17 which engages the cap 18 to limit the outward movement of the valve member or plug 9.

In order to keep the control valve 3 in proper position, a groove 15 is cut in the valve member or plug 9, and this is engaged by a pin 16 extending entirely into the central aperture 8 and guiding the valve member or plug 9.

It is of course understood that the specific description of structure set forth above may be departed from without departing from the spirit of this invention as described in this specification and as defined by the appended claims.

Having now described my invention, I claim:

1. An article of feminine hygiene comprising a valve and a vaginal douche, an inlet to the valve and an outlet from the valve, the valve having a central longitudinal opening, a plug slidable in said central opening, said plug having a part reduced in diameter to form a stem and a shoulder, a spring surrounding the stem and serving to move the plug outwardly, said plug having a transverse opening adapted to be placed in alignment with the inlet and with the outlet whereby liquid may flow from the inlet through the plug and from the outlet through the vaginal douche, the plug having a groove in the inner end thereof, and a second outlet in the opposite direction from the first outlet, the spring being to retract the plug whereby the groove is placed in communication with the inlet and with the second outlet.

2. An article of feminine hygiene comprising a vaginal douche, a valve, and inlet and outlet tubes, the valve comprising a body and three connections, one of them being an inlet and two of them being outlets, the body having a cylindrical opening in one side thereof, an approximately cylindrical plug in the opening, the exposed end of the plug being reduced in diameter, to form a stem, and having a shoulder to limit the outward movement of the plug, said plug having a groove longitudinally of the inner end of the plug to regulate the direction of outflow of liquid, and a spring for moving the plug outwardly, the said groove being connected with the second outlet and being connectible with the inlet when the plug is retracted by the spring.

HOMER C. FRIEND.

References Cited in the file of this patent

UNITED STATES PATENTS

| Number | Name | Date |
|---|---|---|
| 39,812 | Hayman | Sept. 8, 1863 |
| 676,534 | Moore | July 30, 1901 |
| 1,598,615 | Marsh | Sept. 7, 1926 |
| 1,785,658 | Stanley et al. | Dec. 16, 1930 |
| 2,295,366 | Stout | Sept. 8, 1942 |
| 2,507,214 | Medley | May 9, 1950 |